Figure 1:
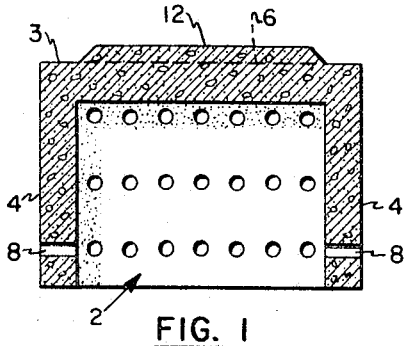
Figure 2:
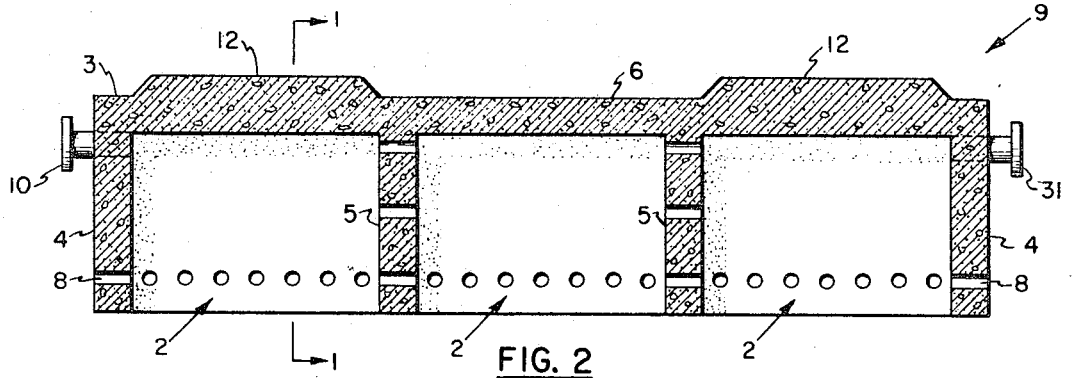
Figure 3:
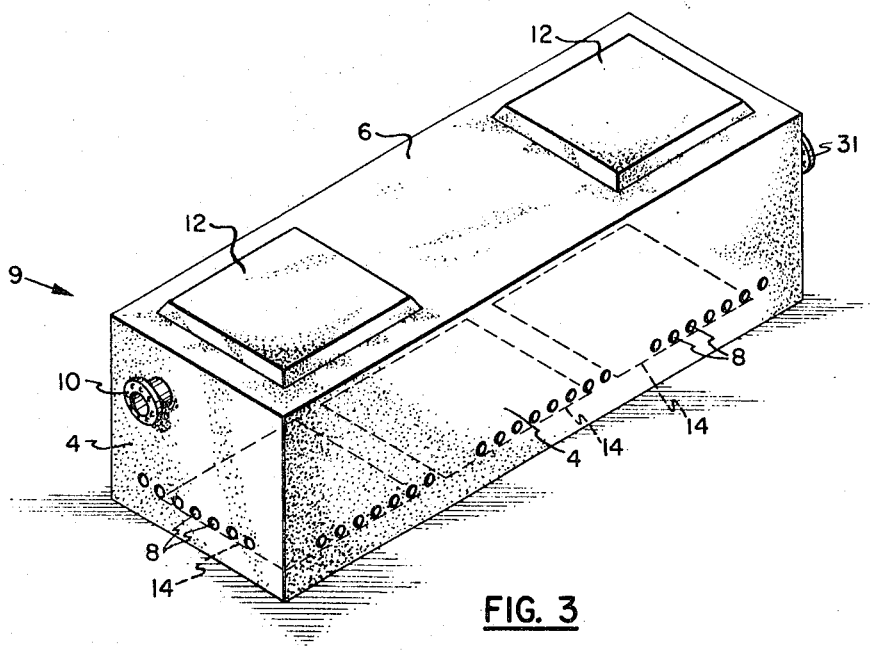
Figure 4:
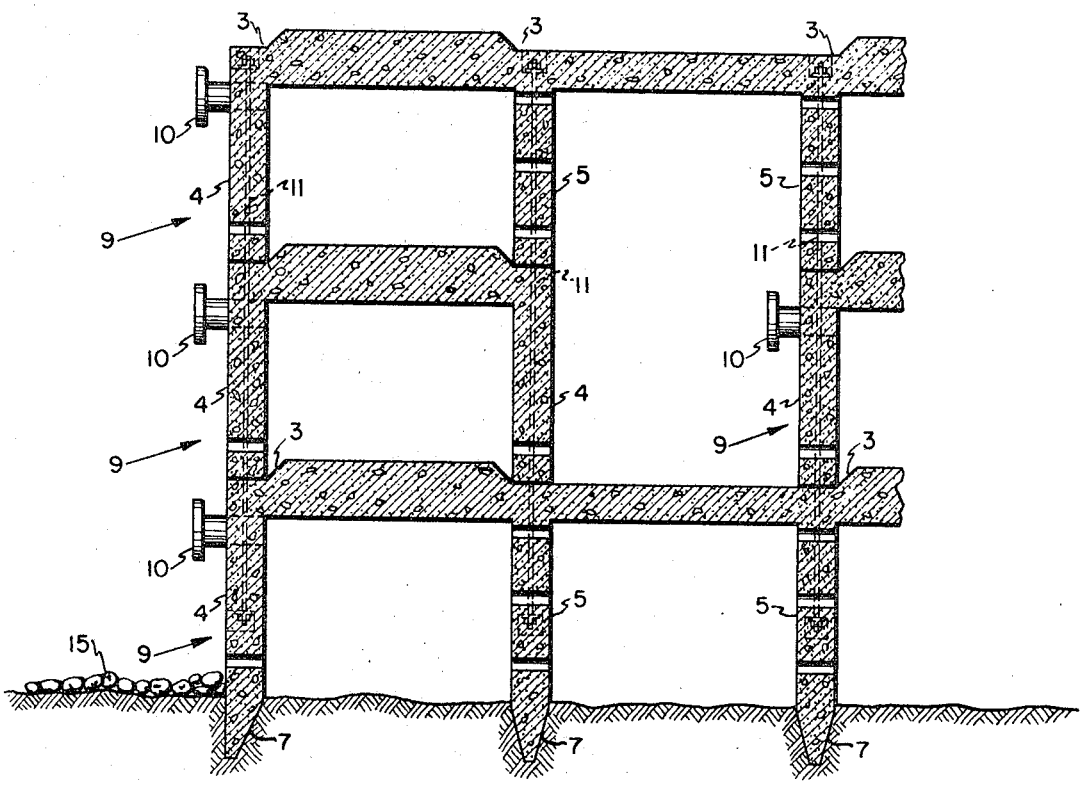
Figure 5:
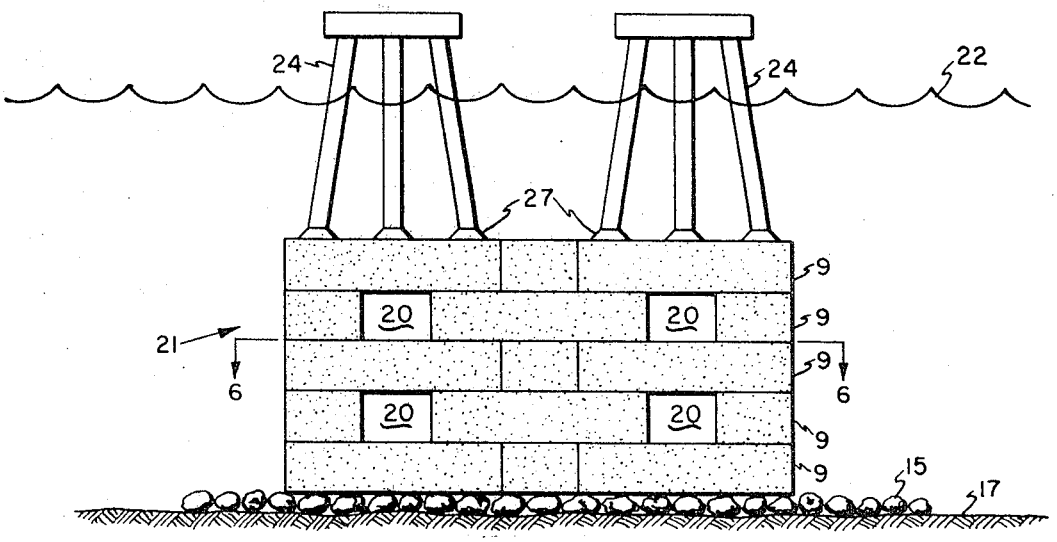
Figure 6:
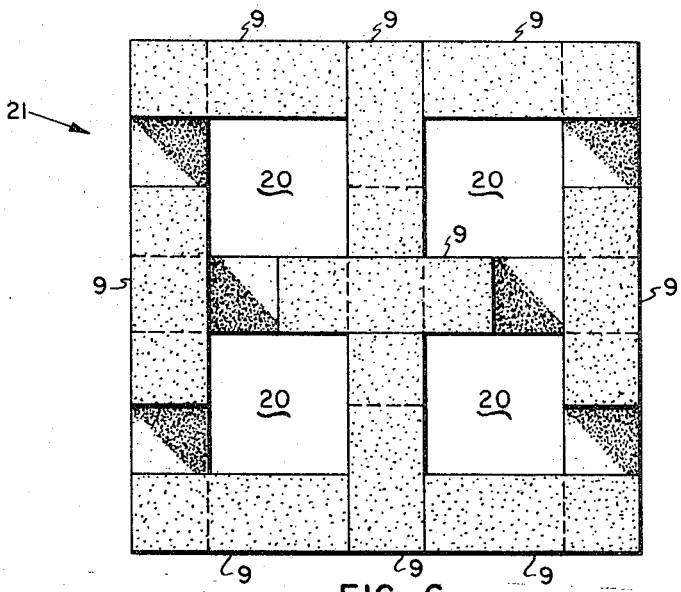
Figure 7:
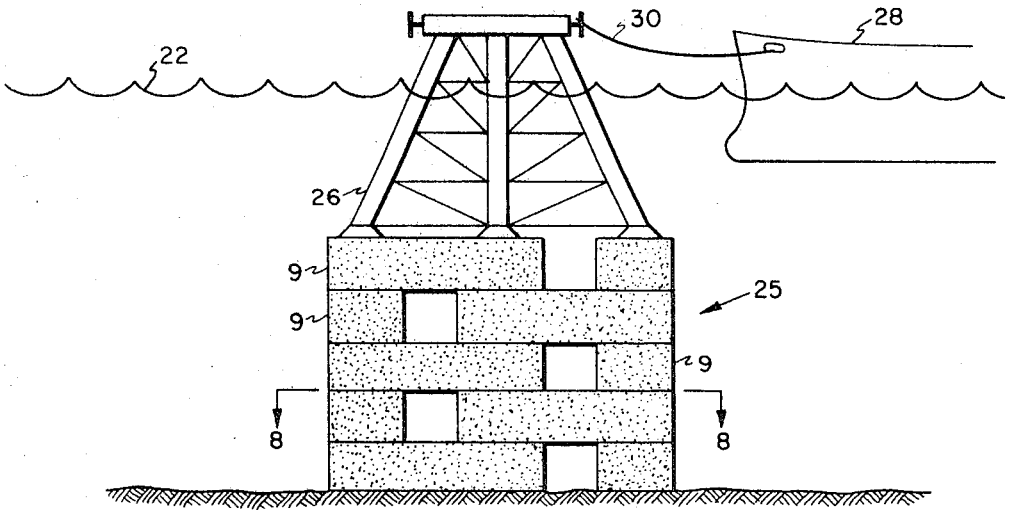
Figure 8:
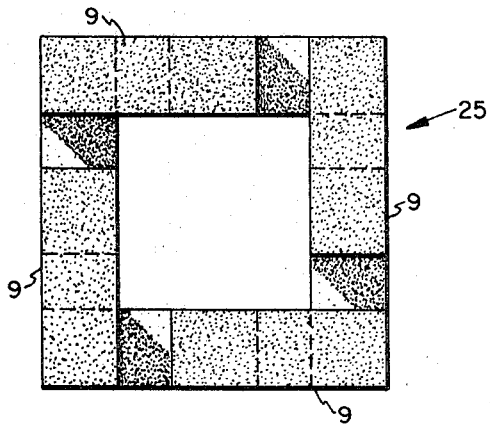
Figure 9:
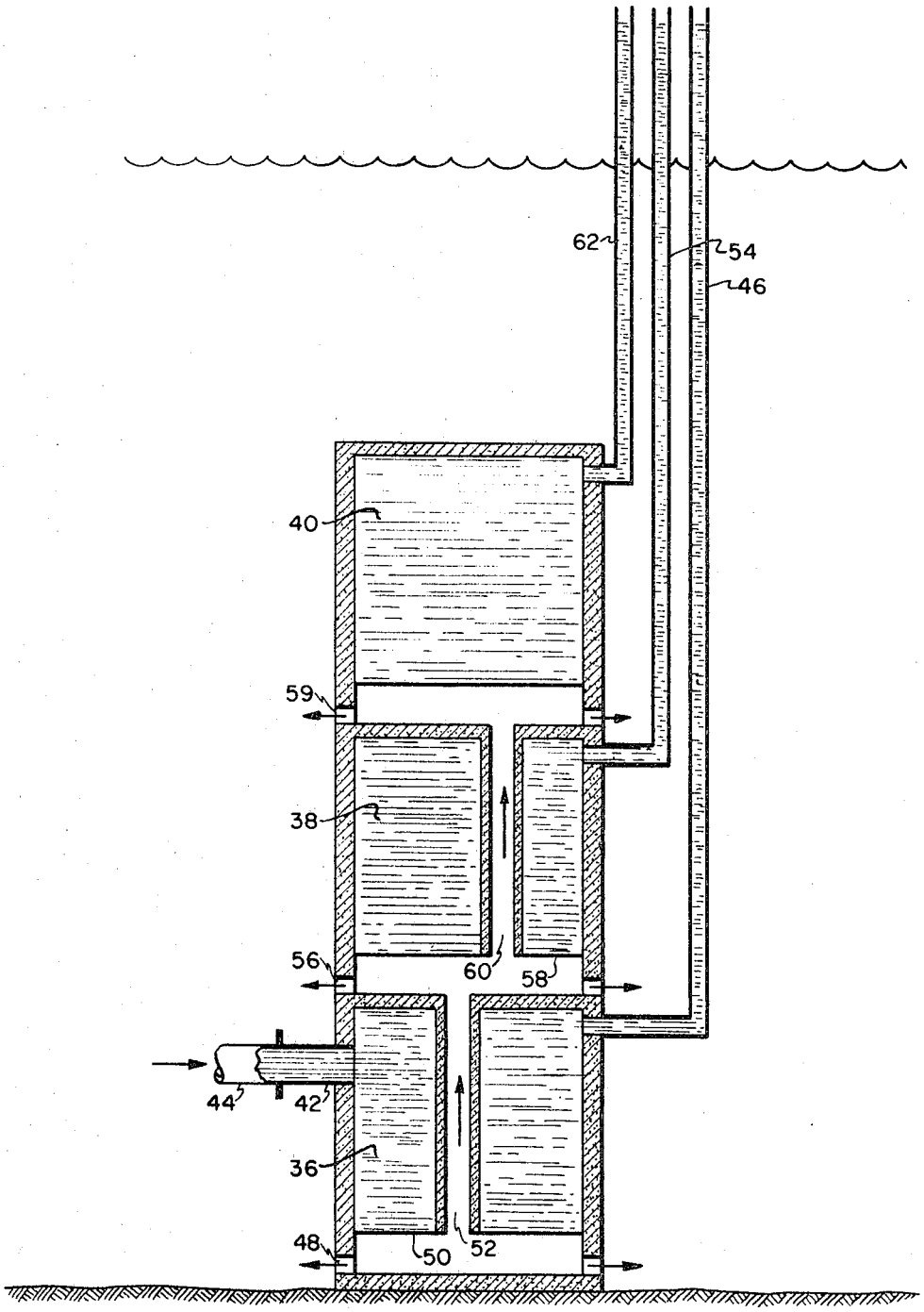

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED JUNE 9, 1970

875 O.G. 341

T875,008
OFFSHORE UNDERWATER FACILITY
Walter R. Hnot, 1524 Deerpath,
Mountainside, N.J. 07092
Filed Apr. 8, 1969, Ser. No. 815,521
Int. Cl. E02d *29/00*
U.S. Cl. 61—46
5 Sheets Drawings. 16 Pages Specification

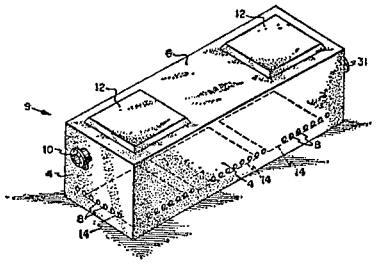

This invention is directed to a marine structure for the underwater storage of oil, or other water-immiscible fluids lighter than water, in offshore areas. The facility comprises a plurality of bottomless concrete receptacles which, due to their weight overcome buoyancy effects, and remain stationary on the sea bed even when filled with oil. The concrete underwater structure has further application as a production platform and as an offshore single point mooring facility.

June 9, 1970 W. R. HNOT T875,008

OFFSHORE UNDERWATER FACILITY

Filed April 8, 1969 5 Sheets-Sheet 1

WALTER R. HNOT INVENTOR

BY Donald F. Wohlers

ATTORNEY

OFFSHORE UNDERWATER FACILITY

Filed April 8, 1969 5 Sheets-Sheet 2

WALTER R. HNOT INVENTOR

BY Donald F. Weblow

ATTORNEY

OFFSHORE UNDERWATER FACILITY

Filed April 8, 1969 5 Sheets-Sheet 3

WALTER R. HNOT INVENTOR

BY Donald F. Wohlwa

ATTORNEY

OFFSHORE UNDERWATER FACILITY

Filed April 8, 1969 5 Sheets-Sheet 4

WALTER R. HNOT INVENTOR

BY Donald F. Wohlers
ATTORNEY

OFFSHORE UNDERWATER FACILITY

Filed April 8, 1969 5 Sheets-Sheet 5

WALTER R. HNOT INVENTOR

BY Donald F. Cooklers

ATTORNEY